Patented Nov. 2, 1937

2,098,037

UNITED STATES PATENT OFFICE 2,098,037

RUBBER TIRE

Eardley Hazell, New York, and Stewart R. Ogilby, West New Brighton, N. Y., assignors to United States Rubber Products, Inc., New York, N. Y., a corporation of Delaware No Drawing. Application February 6, 1935, Serial No. 5,248

9 Claims. (Cl. 154—40)

This invention relates to rubber tires and more particularly to pneumatic tire casings having carcasses with cords comprising artificial silk.

In the manufacture of rubber-fibre material, for use in cord tires and the like, a fabric, usually a cotton fabric, which may or may not be impregnated with rubber, as from a solvent cement or aqueous dispersion of rubber or rubber-like material, is used as a base material. This fabric which may be a square woven fabric or which may comprise cords, with or without filling threads, the latter fabric being merely a series of parallel cords, is usually first coated with a thin "friction" coating of rubber by passing the fabric through a bath of aqueous dispersion of rubber, or a bath of rubber solvent cement, or by friction-calendering on to the fabric a rubber composition which is preferably softened with an organic solvent such as naphtha, gasoline or the like. A "skim-coating" of rubber is then calendered on to the thus treated fabric either on one or both sides and the composite rubber-fabric material is bias cut for plying up in the preparation of the tire carcasses. In some cases, the skim coating of rubber is calendered directly on to the bare cotton fabric. The patent to Hopkinson No. 1,424,020 describes the preparation of a so-called "weftless fabric" or "web fabric" by passing a fabric composed of a series of parallel cords through a bath of an aqueous dispersion of rubber and joining the cords together by the dried rubber deposit from the dispersion adhering to the cords after the same have been withdrawn from the bath. The parallel cords may be arranged so that each cord touches the cord on the other side of the same or they may be separated any desired distance as is well known in the art today. This rubber coated material is then generally skim coated on one or both sides to form the rubber-fabric material which is bias cut and used in the manufacture of tire casings. The skim coating may be applied to the rubber treated fabric by a calendering operation or if desired by further treatment with an aqueous dispersion or a solvent solution of rubber.

In these methods of producing the rubber-fabric material for plying up and vulcanizing together in the manufacture of the tire casings, adequate resistance to fatigue of the tire, and sufficient adhesion between the fabric plies and the vulcanized rubber intermediate the fabric plies is obtained, it is believed, more by virtue of the stray surface fibres of the cotton in the fabric being imbedded in and tenaciously holding on to the rubber and teeth of rubber being embedded between the twists of the cotton cords than by virtue of any strict adhesive bond between the rubber film and the cotton cords themselves. When the cotton of the usual tire cord fabrics is replaced in whole or in part by artificial silk, the present methods of forming the rubber-fabric material are not satisfactory. Threads or cords made from artificial silk unlike those composed of cotton, are substantially free from any stray surface fibres and when it is desired to coat such artificial silk with rubber, the question is not one of adequate adhesion by imbedding stray surface fibres into the rubber layer but is believed one strictly of a direct adhesion between the rubber and the cellulosic composition comprising the artificial silk filaments. In attempting to follow the teachings of the prior art in making tire casings with fabric comprising artificial silk cords, it was found that the resistance to flexing of the carcass was insufficient to provide a tire casing that would stand up in service without premature break-down and separation of the fabric plies.

The present invention relates to the manufacture of tire casings comprising plies of fabric containing cords comprising artificial silk and vulcanized rubber intermediate the plies wherein there is an adequate adhesion between the vulcanized rubber and fabric plies and the fatigue resistance of the tire is of a sufficiently high value that there will be no premature failure of the tire in service because of poor flexing qualities of the tire carcass, or of poor adhesion between the rubber and fabric plies.

According to the present invention, it has been found that adequate fatigue resistance and sufficient adhesion of fabric to rubber in the carcass plies can be obtained by bonding the fabric containing cords comprising artificial silk to the vulcanized rubber by a film comprising rubber and proteinous material and carbon black, for example the solids deposit of an aqueous dispersion of rubber containing casein and carbon black.

In working out the present invention, fabric plies composed of parallel rayon cords made by the viscose process were used, but the invention is in no way limited to the specific type of artificial silk or the kind of fabric used, nor is it limited to fabrics composed entirely of artificial silk threads or cords, since the principles underlying the invention are applicable to varying fabric constructions composed in whole or in part of artificial silk made by any of the well-known processes. The artificial silk used in obtaining the illustrating data below was a viscose rayon of 120 filaments of size 275 denier twisted 7 turns per inch to the left. This yarn is equivalent in weight to about a 21 cotton yarn. The cords used in making the weftless fabric were composed of 5 strands of this rayon yarn twisted 20 turns per inch to the right and 3 of these plied yarns cable twisted 10 turns per inch left hand twist.

As an indication of the relative fatigue resistance of tires made from different carcasses, adhesion and flexing tests were carried out on the various rubber-fabric constructions as follows:

Five of the cabled cords as above described are wound off spools and drawn through the aqueous dispersion to be applied thereto under low tension and are wound spirally touching each other on to a duck liner which in turn is wrapped on to a steel drum 20 inches in diameter revolving at a rate of 3¼ R. P. M. This means that the cord is moving through the solution at a rate of 2 inches per second about 8 inches being immersed in the solution at one time. Between 10 and 50% of the solution adhering to the cord is doctored off. In this way about 26 to 28 cords per inch are laid down side by side. The operation described above takes about 15 minutes after which the solution and cords are dried on the same drum at a gradually rising temperature to prevent blowing or blistering, reaching 180° F. at the end. The drum is then cooled for 10 minutes more and the fabric cut off together with the liner. This fabric is about 12" x 37" in size. In this way about 10 to 15 parts of dispersion solids are put on to 100 parts of bare cord.

The following describes the preparation and curing of stripping pads for the stripping test for comparing the adhesion of rubber to the rayon plies, with the adhesion of rubber to cotton plies. The rubber composition used to form the rubber plies in all cases comprised:

|  | Parts by weight |
| --- | --- |
| Smoked sheet | 100 |
| Zinc oxide | 40 |
| Sulphur | 3.5 |
| Pine tar | 1 |
| Stearic acid | 2 |
| Antioxidant | 1.5 |
| Accelerator | .5 |

The above composition is merely illustrative of any of the various rubber compositions used for skim coating between the fabric plies in building up the carcass. In preparing and curing the stripping pads, .040 to .045" of the above stock is frictioned on to a heavy duck backing and this more of the same stock is plied as a skim coating making the finished gauge of the material .075. A piece 1½" by 10" of this material is taken and two solutioned cords stripped from the web fabric to be tested are laid side by side along its long direction about ⅜" apart and about ¼" from each edge of the piece. These cords are pressed into the stock a very little by hand. Besides these two cords for testing, in this case rayon cords stripped from the web fabric prepared as described above, two bare cotton cords used as controls are laid and held in place by a little cement at each end. This whole piece is next put in a platen press, the skim side covered with Cellophane, shimmed to .080" and 1200 lbs. of hydraulic pressure applied with 30 lbs. of steam for 60 minutes. In this way, the cords are buried in the rubber stock until the upper surfaces are flush with the surface of the rubber stock.

The stripping test is made as follows: The ends of the two rayon cords are clamped into one pair of jaws while the backing material of the piece is clamped in another pair. The steady motion separating the jaws at the rate of 2" per minute is then produced, the pull on the cords being recorded automatically on a graph. About 2 inches of cord are stripped out of the skim coat stock during the test. The two bare cotton cords are held in the same way. A hot stripping or adhesion test is conducted in the same way, the temperature of the whole being maintained at 270° F. By an examination of the record, the average value of the pull in each case is found. Since the exact amount of the imbedding varies from piece to piece, the results of the cords under test are compared with the results of the bare cotton on the same piece, the final results being expressed as percent of pull of bare cotton.

The following describes the flexing test commonly used as a measure of fatigue resistance as described in an article by Gibbons in Ind. Eng. Chemistry, Analytical Edition, volume 2, page 99, January 15, 1930. In preparing flexing pads for this test, the web fabric made as above described by passing the parallel cords through the aqueous rubber dispersion and drying on a liner, is run through a calender and .014" of the skim coat rubber stock above described is put on the side away from the liner. The liner is then stripped off the fabric and enough of the same skim coat stock put on the other side (about 0.14") to make the total weight of the skim coat applied equal to 20 ozs. per sq. yd. of material. Pads of 6-ply thicknesses are then made up from pieces cut from the skim coated fabric, the cords of each ply running perpendicularly to the two adjacent ones and the surfaces originally away from the liner kept uppermost or lowermost in all the plies. Each ply as added to the pile is rolled down by hand. The plied pad is next trimmed to fit a mold 5" x 8" in size and is shimmed with tinfoil to a thickness of .490", the pressure developed during curing bringing the total thickness up to .500". The pad is cured in a French press using low hydraulic pressure with steam at 30 lbs. for 60 minutes. After standing for at least 15 hours, two pieces 1" x 8" each are cut from the 6-ply pad and bent over a bicycle hub ₁₆⁄₁₀" in diameter carrying a load of 100 lbs. By means of a motor, these pads are moved back and forth about the hub travelling about 2" away from the center of the piece each time, so that a complete cycle means a travel of about 8" to the piece. This flexing operation is continued from 9:00 in the morning until 12:00 at noon with a rest period of one hour without tension at noon and the flexing continued from 1:00 to 5:00 and with a rest without tension from 5:00 o'clock at night to 9:00 o'clock the next morning. The end point of the flexing test is taken when a separation of one ply from another occurs. The results of the test are expressed in kilocycles (1,000 cycles) of flexing to cause this separation of plies. This flexing test is an indication of the fatigue resistance of the finished tire.

In attempting to use regular latex web fabric compounds with rayon cords for bonding the skim coat to the rayon fabric, the stripping tests with the best compounds showed cold and hot adhesions 40% to 60% of that of bare cotton. This adhesion is sufficient with a high flexing value, but the flexing tests showed so low a flexing value that the fatigue resistance of tires made from such a carcass would not stand up at all in test.

According to the present invention, it has been found that the addition of proteinous material, for example casein, to the aqueous dispersion of rubber, such as latex, used to bond the skim coat to the cords increases the flexing resistance of the carcass as determined by the flexing test, without materially affecting the cold and hot adhesion. As shown in Table I, the addition of 5 to 40 parts of casein per 100 parts of rubber increases the flexing resistance, with a maximum value at about 20 parts of casein per 100 parts of rubber. The cold and hot adhesion tests show somewhat of an increase around 40% casein but at this point the flexing resistance has decreased considerably from the maximum value at a 20% casein content. In all the tests a latex of the following composition was used as the standard and for compounding according to the present invention:

| | Parts by weight |
|---|---|
| Normal latex (about 36% solids) | 100 |
| Sulphur | 2.5 |
| Zinc oxide | 2.5 |
| Sodium hydroxide | .085 |
| Accelerator | .38 |
| Antioxidant | .63 |

The casein in the examples in the tables below was added to the latex after solubilizing with about 14 parts borax and 7 parts sodium fluoride per 100 parts casein, as well known in the art. Solutions of casein in other materials, as ammonia, lime, or borax, may be used.

Table I

| Latex composition—parts casein per 100 parts rubber | Cold adhesion percent bare cotton | Hot adhesion percent bare cotton | Flexing kilocycles |
|---|---|---|---|
| 0 | 44 | 60 | 22.1 |
| 5 | 47 | 67 | 33.8 |
| 10 | 59 | 50 | 80.8 |
| 20 | 58 | 55 | 85.9 |
| 20 | 67 | 56 | 102.1 |
| 30 | 92 | 83 | 58.9 |
| 40 | 100 | 117 | 51.9 |
| 40 | 95 | 88 | 61.0 |
| 80 | 60 | 45 | 16.8 |

It has been further discovered that the flexing resistance with aqueous dispersions of rubber containing casein may be still further increased by the addition of up to about 40% carbon black. Larger amounts may be used but there is an increased possibility of coagulating the rubber dispersion with greater proportions. The carbon black may be added to the rubber dispersion in a manner well known in the art as by ball milling with solutions of various protective colloids such as soaps and the like and adding to the rubber dispersion. The addition of the carbon black to a latex containing a proteinous material does not materially change the hot and cold adhesion test values. The resultant increase in the flexing value with the addition of carbon black to a latex containing casein is remarkable considering that carbon black alone added to the latex adhesive reduces flexing resistance to almost nil at 30% carbon content, as well as materially decreasing the hot adhesion. Table II shows the detrimental effects of the addition of carbon black alone to the latex used to bond the fabric to the rubber plies.

Table II

| Latex composition—parts carbon black per 100 parts rubber | Cold adhesion percent bare cotton | Hot adhesion percent bare cotton | Flexing kilocycles |
|---|---|---|---|
| 10 | 50 | 33 | 12.7 |
| 20 | 44 | 38 | 8.2 |
| 30 | 42 | 25 | 1.6 |

Table III shows the remarkable increase in resistance to flexing on the addition of carbon black to latices containing 20 and 30 parts casein per 100 parts rubber. When it is realized that the flexing test is a measure of the fatigue resistance of the tire itself, and the hot adhesion test measures the adhesion of the plies at elevated temperatures, as with heavy duty tires and with cars running at high speeds, it will be seen how great the advantages are of utilizing aqueous dispersions of rubber containing both proteinous material and carbon black.

Table III

| Latex composition | | Cold adhesion percent bare cotton | Hot adhesion percent bare cotton | Flexing kilocycles |
|---|---|---|---|---|
| Parts casein per 100 parts rubber | Parts carbon black per 100 parts rubber | | | |
| 20 | 10 | 58 | 55 | 229.2 |
| 20 | 20 | 60 | 90 | 250.2 |
| 20 | 30 | 54 | 58 | 178.0 |
| 20 | 40 | 52 | 45 | 82.5 |
| 30 | 20 | 63 | 80 | 247.7 |
| 30 | 30 | 80 | 100 | 114.1 |
| 30 | 40 | 64 | 80 | 153.3 |
| 10 | 20 | 67 | 55 | 88.6 |

It has been found that other proteinous materials such as glue and gelatin act in a similar manner to casein when added to the latex, with or without carbon black. While in the tests described above, normal latex was used, it is obvious that various other aqueous dispersions of rubber such as concentrated or otherwise compounded natural latices may be used, as well as artificial dispersions of crude or reclaimed rubber, or rubber-like materials, or mixtures of the same. While the fabric in the above tables was composed of parallel cords made of viscose rayon, the principles underlying the present invention are applicable to fabrics made in part of such viscose rayon and in part of cotton or other fibres, and also of fabrics made in whole or in part of cords composed in whole or in part of artificial silk made by any of the other well known processes, such as the cuprammonium rayon process, which like the viscose process produces a regenerated cellulose nitro cellulose rayon process, cellulose acetate process and the like, and whether such artificial silk threads have been de-sulphurized or not.

While the description in the present case is directed more particularly to the manufacture of pneumatic tires, the fundamentals underlying the present invention are equally applicable to other products having plies of fabric and vulcanized rubber intermediate the fabric plies, such as hose and the like, where the adhesion of fabric to rubber and the resistance to fatigue of the product are matters of importance.

As various other modifications will occur to those skilled in the art, it is not intended to limit the invention other than as set forth in the appended claims.

Having thus described our invention, what we claim and desire to protect by Letters Patent is:

1. An article having plies of fabric containing cords comprising artificial silk and vulcanized rubber intermediate the fabric plies, and the solids deposit of an aqueous dispersion of rubber containing proteinous material and carbon black bonding the said vulcanized rubber to the said fabric plies.

2. A pneumatic tire casing having plies of fabric containing cords comprising regenerated cellulose and vulcanized rubber intermediate the fabric plies, and the solids deposit of an aqueous dispersion of rubber containing proteinous material and carbon black bonding the said vulcanized rubber to the said fabric plies.

3. An article having plies of fabric containing cords comprising artificial silk and vulcanized rubber intermediate the fabric plies, and the solids of an aqueous dispersion of rubber containing casein and carbon black, bonding the said vulcanized rubber to the said fabric plies.

4. An article having plies of fabric containing cords comprising regenerated cellulose and vulcanized rubber intermediate the fabric plies, and the solids deposit of an aqueous dispersion of rubber containing casein and carbon black in the proportions by weight of 5 to 40 parts casein and up to 40 parts carbon black per 100 parts of rubber bonding the said vulcanized rubber to the said fabric plies.

5. A pneumatic tire casing having plies of fabric containing cords comprising artificial silk and vulcanized rubber intermediate the fabric plies, and the solids deposit of an aqueous dispersion of rubber containing casein and carbon black and bonding the said vulcanized rubber to the said fabric plies.

6. A pneumatic tire casing having plies of fabric containing cords comprising regenerated cellulose and vulcanized rubber intermediate the fabric plies, and the solids deposit of an aqueous dispersion of rubber containing casein and carbon black in the proportions by weight of 5 to 40 parts casein and up to 40 parts carbon black per 100 parts rubber bonding the said vulcanized rubber to the said fabric plies.

7. A pneumatic tire casing having plies of fabric containing cords comprising artificial silk and vulcanized rubber intermediate the fabric plies, and the solids deposit of a latex composition containing about 20 parts casein and about 20 parts carbon black per 100 parts rubber bonding the said vulcanized rubber to the said fabric plies.

8. A process for bonding rubber to fabric containing cords comprising regenerated cellulose which comprises applying to the fabric a coating from an aqueous dispersion of rubber containing proteinous material and carbon black, applying a vulcanizable rubber composition to the thus coated fabric, and vulcanizing the composite product.

9. In the process of making a tire casing with cords comprising artificial silk, the steps of applying a coating from an aqueous dispersion of rubber containing casein and carbon black next to the cords, drying, applying a layer of vulcanizable rubber over said first coating, and thereafter vulcanizing whereby, the rubber layer will be securely bonded to the cords by the first coating.

EARDLEY HAZELL.
STEWART R. OGILBY.